United States Patent [19]

Drzewinski

[11] Patent Number: 5,284,916
[45] Date of Patent: Feb. 8, 1994

[54] BLOCK COPOLYMERS CONTAINING POLYAROMATIC(ALKYL)METHACRYLATES AND THEIR BLENDS WITH POLYCARBONATES

[75] Inventor: Michael A. Drzewinski, Princeton, N.J.

[73] Assignees: Istituto Guido Donegani S.P.A., Novara; Enichem S.P.A., Milan, both of Italy

[21] Appl. No.: 953,707

[22] Filed: Sep. 30, 1992

[51] Int. Cl.$^5$ .................. C08L 69/00; C08L 53/00
[52] U.S. Cl. ............................. 525/92; 525/90; 525/94; 525/148; 525/299
[58] Field of Search ............... 525/90, 92, 94, 148, 525/299

[56] References Cited

U.S. PATENT DOCUMENTS

| | | | |
|---|---|---|---|
| 4,754,005 | 6/1988 | Roggero et al. | 526/83 |
| 4,906,696 | 3/1990 | Fischer et al. | 525/148 |
| 4,997,883 | 3/1991 | Fischer et al. | 525/67 |

FOREIGN PATENT DOCUMENTS

| | | |
|---|---|---|
| 0297285 | 1/1989 | European Pat. Off. |
| 0326938 | 8/1989 | European Pat. Off. |
| 432727 | 6/1991 | European Pat. Off. |
| 017112 | 1/1991 | Japan |

OTHER PUBLICATIONS

Polymer International, vol. 24, pp. 197-206, 1991, R. P. Quirk, et al., "Dilithium Initiators Based on 1,3-bis(1-Phenylethenyl)benzene. Tetrahydrofuran and Lithium sec-butoxide Effects".
Thermoplastic Elastomers, pp. 50-53, 1987, "Synthesis".
Handbook of Thermoplastic Elastomers, Second Edition, pp. 13-14, 1988, "Synthesis and Commercial Production".
Polymer Engineering and Science, vol. 29, No. 8, pp. 538-542, Apr., 1989, R. Fayt, et al., "Molecular Design of Multicomponent Polymer Systems. XV. Morphology and Mechanical Behavior of Blends of Low Density Polyethylene with Acrylonitrile-Butadiene-Styrene (ABS), Emulsified by a Poly(Hydrogenated Butadiene-b-Methyl Methacrylate)Copolymer".
Journal of Polymer Science: Part A: Polymer Chemistry, vol. 27, pp. 4001-4012, 1989, T. E. Long, et al., "Synthesis and Characterization of Poly(t-Butyl Methacrylate-b-Isoprene-b-Butyl Methacrylate)Block Copolymers by Anionic Techniques".
Macromolecules, vol. 23, pp. 2618-2622, 1990, S. K. Varshney, et al., "Anionic Polymerization of (Meth)Acrylic Monomers. 4. Effect of Lithium Salts as Ligands on the 'Living' Polymerization of Methyl Methacrylate Using Monofunctional Initiators".
Polymer Preprints, vol. 32, No. 1, pp. 299-300, Apr., 1991, R. Fayt, et al., "New Developments in the 'Living' Anionic Polymerization of (Meth)Acrylic Ester".
ACS Polymer Preprints, pp. 150-151, 1989, D. Bucca, et al., "Triblock Copolymers Via Dianionic Initiators".
Recent Advances in Anionic Polymerization, pp. 173-184, 1987, G. Huynh-Ba, et al., "Pyridine-Medicated Anionic Homo- and Copolymerization of Alkylmethacrylate".

(List continued on next page.)

*Primary Examiner*—David J. Buttner
*Attorney, Agent, or Firm*—Oblon, Spivak, McClelland, Maier & Neustadt

[57] ABSTRACT

Polycarbonates (PC) can be blended over all compositions with block copolymers containing polyaromatic(alkyl)methacrylates (PAAM) to form modified but transparent polycarbonates for a number of applications. Furthermore, additional homopolymers corresponding to those in the block copolymer may also be added to further modify the properties of the polycarbonate while still retaining transparency. Polycarbonate plus PAAM block copolymers containing from 1 to 99% by weight PC behave as transparent materials with the PC and the PAAM block forming a continuous, single phase material.

18 Claims, No Drawings

OTHER PUBLICATIONS

Encyclopedia of Polymer Science & Engineering, 2nd Edition, vol. 7, pp. 807–817, 1987, D. N. Schulz, "Hydrogenation".

Recent Advances in Anionic Polymerization, pp. 363–380, 1987, A. D. Broske, et al., "Investigations of Hydrocarbon Soluble Difunctional Organolithium Initiators Based Upon 1,3-Bis(Phenyl Ethenyl) Benzene".

Polymer, vol. 32, No. 7, pp. 1274–1283, 1991, M. Nishimoto, et al., "Miscibility of Polycarbonate with Methyl Methacrylate-Based Copolymers".

Journal of Applied Polymer Science, vol. 44, pp. 2233–2237, 1992, T. Kyu, et al., "Single-Phase Blends of Polycarbonate and Poly(Phenyl Methacrylate)".

Recent Advances in Mechanistic and Synthetic Aspects of Polymerization, pp. 101–117, 1987, R. Jerome, et al., "The Anionic Polymerization of Alkyl Acrylates: A Challenge".

Recent Advances in Mechanistic and Synthetic Aspects of Polymerization, pp. 79–100, T. E. Long, et al., "Controlled Synthesis of Various Poly(Alkyl Methacrylate) by Anionic Techniques".

BLOCK COPOLYMERS CONTAINING POLYAROMATIC(ALKYL)METHACRYLATES AND THEIR BLENDS WITH POLYCARBONATES

BACKGROUND OF THE INVENTION

1. Field of the Invention:

Polymer blends containing a polycarbonate (PC) and one or more block copolymers having the general structures: A-b-B (diblock); A-b-B-b-A (triblock); B-b-A-b-B (triblock); or (A-B)$_n$ (multiblock) as examples, where the A block is a polymer of an aromatic(alkyl)methacrylate (PAAM) such as polyphenyl methacrylate, polybenzyl methacrylate or polyphenylethyl methacrylate; the B block is a rubbery polymer such as polyisoprene (PiP), polybutadiene (PBD), polylauryl methacrylate (PLM), siloxane rubber or polybutyl acrylate (PBA); and "b" indicates a block structure. When thoroughly mixed with polycarbonate the block copolymers enhance thick section toughness and low temperature impact strength without impairing transparency.

2. Discussion of the Background:

The present invention pertains to PC/PAAM-b-B binary blends, as well as ternary blends containing up to 15% of additional PAAM and/or B homopolymers. These compositions contain a thermodynamically miscible, single phase of PC and PAAM, plus very finely dispersed particles of the B block in a separate phase, which are usually on the order of 40 to 2,000 angstroms and thus much smaller than the wavelength of light. The combined effects of the single phase nature of the PC/PAAM mixture plus the very small size of the dispersed second block leads to an optically transparent material. Furthermore, the chemical attachment of the B block to the PAAM block assures perfect adhesion and translation of physical properties from the B block to the PC/PAAM phase. Thus, one can obtain a mixture which combines the advantageous properties of two dissimilar materials and still maintain transparency. A fine and stable dispersion that retains transparency can only be obtained through the use of block copolymers which have one block that is thermodynamically miscible with the polycarbonate. Thus, the basis of this invention is two-fold: 1) the synthesis of block copolymers having one block that is thermodynamically miscible with PC and another block capable of improving some deficiency of polycarbonate; and 2) preparation of blends of such block copolymers with PC (and optionally, additional corresponding homopolymers) which exhibit improved properties over polycarbonate alone, yet retain the benefit of its clarity.

Aromatic polycarbonates exhibit good thermal stability, good dimensional stability, good impact strength in thin sections, relatively good stiffness and most notably good transparency. For these reasons, PC is used in a variety of applications including glass replacement, housings, medical devices and containers. Nevertheless, PC does have drawbacks such as poor scratch resistance, poor long term U.V. stability and poor stress birefringence which must be dealt with, especially in demanding optical applications. Moreover, it is often desirable to improve the processability, thick section toughness and low temperature impact strength of PC without sacrificing its transparency.

Block copolymers are a general class of materials that exhibit a wide range of properties and are unique in their ability to "microphase separate" which refers to a fine separation of the two dissimilar polymer blocks into distinct phases.

Methacrylic ester based polymers suffer from poor dimensional stability and poor heat distortion yet have good clarity, surface hardness, U.V. resistance and processability. For this reason they are commonly used in applications such as window glazings, aircraft windows and automotive lenses and lightcovers. Thus, blends of PC and methacrylic polymers should have a good balance of properties and, if they formed a single phase, would also be clear. Unfortunately such blends, even if transparent, would still suffer from poor low temperature impact strength and poor thick section toughness. The simple addition of a rubber impact modifier would greatly improve such deficiencies but at the certain impairment of transparency because rubbery impact modifiers are notoriously incompatible with both PC and methacrylates. Thus the task existed of finding a methacrylic ester-based polymer which is thermodynamically miscible with polycarbonate and which can be block copolymerized with an impact modifier, such as polyisoprene, to prepare a blend of the two which exhibits not only the improvements gained from the blending of PC and the methacrylate polymer but also has improved thick section toughness and low temperature impact strength, all while retaining the inherent transparency of polycarbonate.

The term "thermodynamically miscible" is known in the art to define a polymer blend that mixes on the molecular level so as to form a single, homogeneous phase which exhibits only one glass transition (Tg). The term is used in comparison to the term "mechanically compatible" which is taken to mean that mixing of the polymers is on a small scale but larger than the molecular level. Furthermore, mechanical compatibility implies that the multiple phases exhibit good adhesion to one another providing good mechanical properties. Although both thermodynamically miscible and mechanically compatible blends exhibit good mechanical properties, only thermodynamically miscible blends are transparent owing to their single phase nature.

Although blends of PC with methacrylic polymers are often compatible resulting in improvements over their respective components, most are not miscible and their opacity makes them unacceptable in optical applications. For example, U.S. Pat. No. 4,319,003 teaches that blends of PC and polymethyl methacrylate (PMMA) are opaque and often do not possess, the advantageous properties expected of such mixtures. Among other references that report the immiscibility of PMMA with PC are JP 7216063 and EP 0297285.

Ways to overcome the immiscibility of typical PC/PMMA mixtures have, however, been disclosed. The most commonly employed method is the addition of comonomers to the PMMA (DE 2264268; DE 3632946; and U.S. Pat. No. 4,906,696). Recently a number of patents and publications have appeared which demonstrate the miscibility of PC with random copolymers containing methylmethacrylate and either cyclohexyl methacrylate or phenyl methacrylate. The thermodynamic miscibility of PC with pure polyphenyl methacrylate was also reported. EP 0297285; U.S. Pat. No. 4,906,696; J. Appl. Polym. Sci. 44, 2233-2237, 1991; and Polymer 32(7), 1274-1283 (1991). This miscibility property was used to increase the adhesion between a rubbery impact modifier, ethylene-propylene-diene (EPDM), and polycarbonate. In that case, phenyl methacrylate was grafted onto EPDM. However, the resulting graft copolymer was mechanically compatible with PC but not thermodynamically miscible, as might have been hoped.

U.S. Pat. No. 4,997,883 and EP 0326938 both teach the art of grafting aromatic(meth)acrylate/methylmethacrylaterandom copolymers onto a preexisting EPDM polymer to prepare an elastomeric graft copolymer which, when added to PC, shows improvement in impact strength. Unfortunately, all of these materials are also opaque. Thus, the task still existed to develop a means of blending PC with impact modifiers without simultaneous loss of clarity. I have discovered that this goal can be achieved with a block copolymer containing a polyaromatic(alkyl)methacrylate block and a second block consisting of the impact modifier. When thoroughly blended with PC, the mixtures produce transparent, modified PC-based materials, in contrast to the opaque mixtures of the prior art based on EPDM graft copolymers. Thus, the present invention represents a distinct improvement over the technique where PC-miscible polymers are grafted onto an impact modifier.

In addition, I have found that polybenzyl methacrylate and polyphenylethyl methacrylate are completely miscible in all proportions with polycarbonate, and that copolymers containing blocks of these polymers have the same property.

A general synthesis of well defined methacrylic ester-containing block copolymers has only recently been accomplished (See for example: "Recent Advances in Mechanistic and Synthetic Aspects of Polymerization", Kluwer Academic Publishers, Norwell, Mass., 1987; and "Recent Advances in Anionic Polymerizations", Elsevier Publishing Co., New York, N.Y., 1987). These reports have focused primarily on polymers containing blocks of polymethyl methacrylate or polybutyl methacrylate made by an anionic mechanism. Typically, anionic polymerization is used for the synthesis of well defined block copolymers because the reaction has no naturally occurring termination step. However, the presence of carbonyl groups initially caused problems with the polymerization of methacrylate monomers until methods were developed to prevent attack on the carbonyl groups. The most commonly accepted method is the combined use of low temperature polymerization ($-78°$ C.) and modification of the initial anion, either by prereaction with 1,1-diphenylethylene or by variation of its reactivity by reaction/chelation with pyridine and/or LiCl. Within the above cited references, no method for the anionic polymerization of polyaromatic-(alkyl)methacrylates (PAAM) is given nor a synthesis of well defined block copolymers containing PAAM blocks. Thus the task still existed of developing a method for synthesizing methyl methacrylate/PAAM block copolymers.

SUMMARY OF THE INVENTION

It is an object of this invention to provide a thermoplastic, melt processable composition which is a mechanically compatible, transparent blend of polycarbonate and a block copolymer containing a polyaromatic-(alkyl)methacrylate block plus a second block.

Another object of this invention is to prepare blends in which polycarbonate and the polyaromatic(alkyl)methacrylate portion(s) of a block copolymer form a thermodynamically miscible, stable, single phase material at all compositions while the other portion(s) is microphase separated with a dispersed size less than the wavelength of light resulting in a transparent and improved PC based material.

Another object of this invention is to provide novel block copolymers containing a polyaromatic(alkyl)methacrylate block and a rubbery second block. When blended with polycarbonate these copolymers enhance the thick section and low temperature toughness of the material.

DETAILED DESCRIPTION OF THE PREFERRED EMBODIMENTS

Known anionic synthetic routes to polymethacrylates can be modified to prepare well defined block copolymers containing polyaromatic(alkyl)methacrylate blocks. When blended with polycarbonate, the new block copolymers exhibit only one glass transition for the mixed PC/PAAM phase and contain well dispersed, microphase separated particles of the second block which enhance the thick section and low temperature impact properties of the PC material. Most importantly and uniquely, these improvements in properties occur without loss of clarity. This surprising behavior is observed over all compositions of PC and the PAAM block copolymer containing:

(I) 1 to 99 weight % of an aromatic polycarbonate (PC), preferably that derived from Bisphenol A, and (II) 99 to 1 weight % of a block copolymer which has at least one block consisting of a polyaromatic(alkyl)-methacrylate, such as polyphenyl methacrylate or polybenzyl methacrylate and a second block, e.g., polyisoprene, which is capable of imparting improvements to PC, such as thick section or low temperature toughness.

In addition, one may also add the corresponding homopolymers of the block copolymer (e.g. polyphenylmethacrylate and/or polyisoprene) in amounts of 0–15 weight % compared to the total weight of the PC and the PAAM block, in order to widen the property variations possible while still maintaining clarity. Furthermore, if one chooses, more than 15% of the corresponding homopolymers may be added to achieve a wider variation in properties but at the loss of transparency.

The block copolymers of this invention are of general diblock, triblock and multiblock structures represented by the formulae A-b-B, A-b-B-b-A, B-b-A-b-B or (A-B)$_n$ where the A block is an aromatic(alkyl)methacrylate and the B block is a polymer capable of imparting improvement in PC properties particularly thick section and low temperature toughness. Examples of B type polymers are polyisoprene, polybutadiene, polylauryl methacrylate, polybutyl acrylate and poly-C$_1$-C$_{10}$-alkyl acrylates. In addition, styrenics, such as polystyrene and poly-C$_1$-C$_4$-alkyl styrene, dienic rubbers and siloxane elastomers are suitable.

The polyaromatic(alkyl)methacrylate components of this invention are represented by the formula:

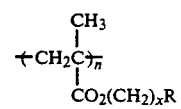

where n is an integer from 10 to 5,000; preferably from 60 to 2,000 and most preferably from 80 to 800; x is an integer from 0 to 4, preferably 0, 1 or 2; R is a phenyl, substituted phenyl or naphthalenic moiety. Suitable phenyl substituents are halogen, phenyl, C$_1$-C$_6$-alkyl, $C_1$-$C_6$-alkoxy, hydroxy, amino, carboxyl and $C_1$-$C_6$-alkoxycarbonyl.

The specific use of a block copolymer and the fact that it contains a polyaromatic(alkyl)methacrylate block are the key factors leading to the success of this invention. By coupling the miscibility of PAAM with PC, and the use of PAAM block copolymers, a totally transparent, but property-altered PC based material can be produced which is superior to the prior art compositions containing EPDM graft copolymers discussed above. More specifically, it is the miscibility of the PC and PAAM that gives a single, transparent phase and it is the unique phase separating behavior of block copolymers that finely disperses the other block in the PC/PAAM phase at a size smaller than the wavelength of light. Moreover, additional homopolymer materials may be added to these binary blends which act only to either mix homogeneously, as in the case of PAAM, or to swell the dispersed second phase when additional second block homopolymer is present. This swelling can continue until the dispersed phase grows in size near to that of the wavelength of light. This does not occur below 15 weight % but obviously one may elected to add more than 15% if transparency is not important.

It is apparent that the characteristics of the final material will depend strictly on the content of the various components of the alloy such that the properties will tend to vary linearly from those of pure PC to those of pure block copolymer. Since such blends can be made at will, a wide variety of properties can be achieved. At higher proportions of PC, one should expect to have higher temperature resistance, dimensional stability and stiffness with an improvement in processability, scratch resistance, thick section toughness and low temperature impact strength over that of PC. At high levels of block copolymer, one may expect very high toughness and low temperature performance with a relative increase in stiffness and dimensional stability over that of the pure block copolymer. Thus, this invention can be used to overcome not only the deficiencies of PC but those of polybenzylmethacrylate, polyethylphenylmethacrylate or PAAM block copolymers, all while retaining transparency.

The polymer blends of this invention constitute a new class of materials which have numerous commercial applications owing to their transparency and improved properties over that of PC, PAAM or PAAM block copolymers alone. They may be used in existing applications for PC where transparency is important but also provide additional benefits such as low temperature performance, better scratch resistance and better environmental stability than existing PC based materials. New applications such as improved optical disks, clear housings, medical containers, window glazings, greenhouse windows, recreational equipment, filter housings, food storage and water bottles could easily be prepared with these improved resins.

The PAAM block copolymers of this invention, particularly those consisting of polyphenyl methacrylate or polybenzyl methacrylate and a second block consisting of a rubbery polymer, e.g., polyisoprene or polylauryl methacrylate, have been prepared for the first time. A modified anionic polymerization scheme was employed. The "second block" material is synthesized first, using n-butyl lithium as a polymerization initiator for isoprene, in an inert solvent such as toluene. This portion of the reaction is carried out at 40° C. for approximately 2-4 hours depending on the size of the reaction. In all cases the reaction is carried to completion in terms of 100% conversion of monomer to polymer. At this point 1,1-diphenylethylene is added in an amount equivalent to the number of living anionic chain ends. A small amount of etherial solvent, such as tetrahydrofuran, is also added. Upon addition of these ingredients the reaction is cooled to −78° C. and the PAAM monomer, e.g., benzylmethacrylate, is added. Again the reaction is run to completion so that all of the benzylmethacrylate is consumed, at which point acidified methanol is added to terminate the anionic chain ends. The resulting soluble polymer is precipitated from the toluene with a nonsolvent such as methanol, washed with methanol and vacuum dried.

The block copolymers made in this fashion are typically of the A-b-B (i.e., AB diblock) type but one can make B-b-A-b-B (i.e., B-A-B triblock), A-b-B-b-A (i.e., A-B-A triblock) and (A-B)$_n$ multiblock types by employing known methods in the art such as difunctional initiators, reactive coupling and sequential addition techniques. Triblock copolymers are usually prepared by one of three methods: sequential addition of monomers, reactive coupling, or difunctional initiation. In the first method, the monomers are reacted in sequence as implied so as to form an A-B-A type material. In the second method an A-B type material is initially produced but is coupled while still reactive so as to form an A-(BB)-A or simply A-B-A triblock. The coupling reaction occurs by addition of a difunctional linking material including certain diester, diorganohalogen, silicon dihalides, and iminic compounds. Examples of these coupling agents have been reviewed and patented. ("Thermoplastic Elastomers", eds. N. Legge, G. Holden & H. Schroeder, MacMillan Publishing, New York, 1987; "Handbook of Thermoplastic Elastomers", 2nd ed. eds. B. Walker and C. Rader, Van Nostrand Publishers, New York, 1988; U.S. Pat. No. 4,754,005).

The third method of difunctional initiation works by polymerizing the material from the inside out by beginning the polymerization of the "B" block first, on both ends simultaneously, and then the addition of the "A" monomer leads to the A-B-A structure. Examples of such initiators include: 2:1 n-butyl lithium:1,3-bis(1-phenylethenyl)benzene; m-xylene dianions prepared by addition of m-xylene to two equivalents of Lochmann's base (1:1 n-butyl lithium:potassium t-butoxide complex in hexane); and 2:1 n-butyl lithium:m-disopropenylbenzene. The synthesis and use of these materials has been documented. (Polymer International, 24, 197, 1991; ACS Polymer Preprints, April 1989, pp. 150–151; and "Recent Advances in Anionic Polymerizations", eds. T. Hogen-Esch & J. Smid, Elsevier Publishers, Netherlands, 1987.)

The rubbery polymer can contain residual carbon-carbon double bonds if derived from a diene monomer such as isoprene. Homopolymers and copolymers containing dienics such as polybutadiene and polyisoprene can be hydrogenated so as to produce a new material with improved thermal and oxidative stability over the original dienic materials. There are many methods of hydrogenation but the most preferable are catalytic hydrogenations using mixed systems containing a transition metal salt (usually based on cobalt or nickel) and a reducing agent such as triethylaluminum or n-butyllithium. Examples include homogeneous cobalt chloride/pyridine/triethylaluminum complexes; homogeneous nickel octanoate/triethylaluminum complexes; and homogeneous rhodium systems such as [P(C₆H₅)₃RhCl]. Heterogenous systems can also be used by supporting active catalysts such as [P(C₆H₅)₃RhCl] on inert substrates such as silica, zeolites, carbon black, etc. Details of hydrogenation can be found in many reviews such as in the "Encyclopedia of Polymer Science and Engineering" 2nd edition, Volume 7, John Wiley & Sons, New York, 1987.

Generally, the PAAM block should be above 10,000 g/mole in molecular weight and more preferably in the 12,000 to 85,000 g/mole range, although any desired molecular weight can be made. Similarly, the second block should also be above 10,000 g/mole and more preferably in the 30,000 to 150,000 range. The relative ratios of the two blocks can be varied as well depending on the resultant property variation desired. For thick section toughness and low temperature impact strength, one should prepare a material containing predominately the second block, e.g., polyisoprene, with a PAAM/polyisoprene ratio of about 1:3 to 1:5. The weight ratios of each block are generally 0.1:1 to 1:1, preferably 0.5:1 to 1:1.

The alloys of this invention can be blended with a wide variety of aromatic polycarbonates, such as one derived from Bisphenol A. Suitable aromatic polycarbonates are homo- or co-polycarbonates and mixtures thereof. Aromatic polycarbonates are produced by reacting di-(monohydroxyaryl)-alkanes, dihydroxybenzenes, or alkyl or halogen-substituted derivatives thereof with derivatives of carbonic acid, such as carbonic acid diesters, phosgene, bis-chlorocarbonic acid esters of di-(monohydroxyaryl)-alkanes, the bis-chlorocarbonic acid esters of dihydroxybenzenes and their substituted derivatives. These polymers can be manufactured by known processes as described in U.S. Pat. No. 4,548,997.

Aromatic polycarbonates are represented by the formula

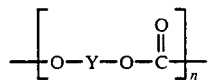

wherein Y is a radical of formula

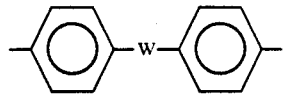

wherein W is $C_1$–$C_6$ straight or branched alkyl, carbonyl, sulfonyl, oxygen, sulfur or single bond, and n is an integer between 10 and 30,000, preferably between 100 and 10,000.

Suitable diphenolic compounds "Y" include: 2,2 bis(4-hydroxyphenyl)propane, bis-(4-hydroxyphenyl)methane, 2,2-bis-(4-hydroxy-3-methylphenyl)-propane, 4,4-bis(4-hydroxyphenyl)heptane,2,2-(3,5,3',5'-tetrachloro-4,4'-dihydroxyphenyl)propane, 2-(3,5,3',5'tetrabromo-4,4'-dihydroxyphenyl)propane and (3,3'-dichloro-4,4-dihydroxyphenyl) methane.

Polycarbonates are typically prepared using a molecular weight regulator, an acid acceptor and a catalyst. The molecular weight regulators include phenol, cyclohexanol, methanol and para-tert-butylphenyl. The acid acceptors can be either organic or inorganic bases such as alkyl and aromatic amines, e.g., pyridine, triethylamine and dimethylaniline, as well as hydroxides, carbonates and phosphates of alkaline and alkaline earth metals.

The catalysts used for the production of polycarbonate are those that promote esterification and include tertiary amines, quaternary ammonium compounds and quaternary phosphonium compounds. Examples include triisopropyl amine, tetraethylammonium bromide and n-butyltriphenylphosphonium bromide.

The preferred polycarbonates are produced with 2,2-bis-(4-hydroxyphenyl)propane, commonly known as Bisphenol A. Polycarbonates of the bisphenol A type are commercially available and include Makrolon (Mobay Corporation), Lexan (General Electric Corporation) and Sinvet (EniChem). The number average molecular weights of these polycarbonates are on the order of 10,000 to 200,000 g/mole but more preferably in the 20,000 to 100,000 range with relative viscosities of about 1.0 to 1.5 as measured in methylene chloride at 0.5 weight % and at 25° C.

The preferred polymer blends are binary blends of polycarbonate with block copolymers containing a polyaromatic (alkyl)methacrylate block. In addition to the above described components, alloys of this invention may contain additional materials such as stabilizers, antioxidants, slip agents, plasticizers, flame retarders, fillers, antislats and colorants. Antioxidants include phenolics, hindered amines, thioesters, and phosphite compounds. Suitable dyes, pigments and special color concentrates include a wide variety of chemical compounds, both organic and inorganic. Leading suppliers include Ferro, Harwick, Ciba-Geigy and Crowley.

Flame retardants include aluminum hydrates, halogenated compounds, antimony trioxide and phosphate esters. They are sold by a wide variety of companies including Mobay, Ferro, Harwick and Akzo.

Ultraviolet stabilizers are quite complex compounds but are generally of the benzophenone, benzotriazole or nickel-organic types. They are sold by Ciba-Geigy, BASF, Ferro, American Cyanamid.

Suitable fillers include aramid fibers, glass fibers, ceramic fibers, metal fibers, carbon fibers, fillers such as glass beads, minerals such as calcium carbonate, kaolin, talc, micas and silicas.

The preparation of these blends may be carried out with many processes known in the art for compounding. The components may be mixed in solution or in the molten state using various forms of mechanical and thermal processing equipment such as roll mixers, blade mixers, screw extruders and the like. The resultant blend can then be further processed and shaped by well known methods such as all forms of extrusion and molding.

The resultant blends of this invention are transparent thermoplastic materials with a wide range of properties, in particular more favorable properties than those exhibited by any component alone. For example, the thermoplastic processing, long term environmental stability, scratch resistance, thick section toughness and low temperature impact strength of commercial polycarbonates can all be improved through the teachings of this invention. As a result, blends of the present invention have many commercial applications.

Other features of this invention will become more apparent in the course of the following descriptions of exemplary embodiments which are given for illustration and are not intended to be limiting thereof.

EXAMPLE 1

Synthesis of Polybenzyl methacrylate—Polyisoprene Diblock Copolymer (PBzMA-PiP)

All reagents were purified by conventional procedures to meet the stringent standards for anionic synthesis. Toluene (500 ml) was transferred into a clean 1,000 ml glass reactor under purified argon gas and heated to 40° C. Then 0.55 ml of 1.6 M n-butyl lithium was added by syringe followed by 25 ml of isoprene monomer. Aliquots were extracted periodically to follow the percent conversion by gel permeation chromatography. After all of the isoprene was converted to polymer, 0.15 ml of 1,1-diphenylethylene was added followed by 100 ml of tetrahydrofuran. After ten minutes the reaction was gradually cooled to −78° C. at which time 25 ml of benzyl methacrylate were added. Again aliquots were taken and the conversion of benzyl methacrylate monitored by GPC. At the end of the reaction, 6 ml of acidified methanol were added to terminate the living anionic end groups. The total contents of the reaction were then precipitated in 1,700 ml of methanol, filtered, washed with methanol and vacuum dried. Differential scanning calorimetry (DSC) of the product showed that it exhibits two glass transitions (Tg) at −59° C. and 62° C. corresponding to the polyisoprene and polybenzyl methacrylate blocks, respectively. Transmission electron microscopy revealed a microphase separated morphology on the order of 200 angstroms which is indicative of a block copolymer structure.

EXAMPLE 2

Synthesis of Polyphenyl Methacrylate—Polyisoprene Diblock Copolymer (PPhMA-PiP)

In a reaction scheme analogous to Example 1, a diblock copolymer of polyphenyl methacrylate—polyisoprene was prepared. DSC revealed two Tg's of approximately −60° C. and 124° C. for the respective polyisoprene and polyphenyl methacrylate phases. Transmission electron microscopy confirmed the block copolymer structure.

EXAMPLE 3

Solution Prepared Blends with Polycarbonate

Materials from Examples 1 and 2 were solution blended with polycarbonate of Tg=149° C. (Sinvet 251) in chloroform at room temperature at various weight ratios and each mixture was coagulated into isopropanol, filtered and dried under vacuum at 80° C. for several hours. Each blend was then tested by differential scanning calorimetry (DSC) after first being heated to 275° C. to remove any non-equilibrium effects and to simulate melt blending. Compression molded films of these blends were highly transparent to the eye. The DSC was run from 25° to 275° C. at 20° C./minute and the glass transition of the mixtures recorded. The results are contained in Table 1. The single glass transition exhibited by these blends is consistent with well known behavior for thermodynamically miscible polymer blends.

As a comparison, commercial polymethyl methacrylate of Tg=111 (Scientific Polymer Products) was also solution blended with polycarbonate and tested in the same way. The resulting blends were opaque and brittle when compression molded and exhibited two glass transitions as measured by DSC. The results are also contained in Table 1.

TABLE 1

| PC/Block wt. ratio | PBzMA-PiP Tg | PPhMA-PiP Tg | PMMA Tg |
|---|---|---|---|
| 100/0 | 149 | 149 | 149 |
| 85/15 | — | 147 | 115/147 |
| 80/20 | 142 | — | — |
| 70/30 | — | 146 | 118/149 |
| 60/40 | 123 | — | 117/149 |
| 50/50 | — | 145 | — |
| 40/60 | 116 | — | 119/148 |
| 30/70 | — | 144 | 117/148 |
| 20/80 | 106 | — | — |
| 15/85 | — | 139 | 116/147 |
| 0/100 | 62 | 124 | 111 |

EXAMPLE 4

Melt Processed Blends With Polycarbonate

A variety of mixtures containing the polycarbonate of Example 3, diblock copolymers prepared by procedures of Examples 1 and 2, and occasionally additional polyisoprene were melt blended in a Haake-Buechler miniextruder at 275° C. and then injection molded in a Engel Injection Molder at 270° C. The resultant molded bars were tested for impact strength at four temperatures: 20, 0, −20 and −40° C. and at two thicknesses of ⅛″ and ¼″ as per ASTM Standard D256. The results of these tests are summarized in Table 2 along with a notation of the transparency.

TABLE 2

| | (All values are in units of ft.-lb/in.) | | | | |
|---|---|---|---|---|---|
| Blend | 20° C. ⅛″/¼″ | 0° C. ⅛″/¼″ | −20° ⅛″/¼″ | −40° ⅛″/¼″ | Appearance |
| PC | 17/2.5 | 15/2 | 9/2 | 2/2 | Clear |
| A | 17/8 | 15/7 | 13/4 | 3/3 | Clear |
| B | 12/12 | 12/6 | 10/4 | 3/3 | Clear |
| C | — | — | — | — | Opaque |
| D | — | — | — | — | Clear |
| E | 16/14 | 15/12.5 | 12.5/7 | 4/4 | Clear |
| F | —/8 | —/4 | —/2 | —/2 | Opaque |

Blend A = 90% PC + 10% PBzMA-PiP of Example 1.
Blend B = 96% PC + 3.5% PBzMA-PiP of Example 1 + 0.5% PiP.
Blend C = 70% PC + 10% PBzMA-PiP of Example 1 + 20% PiP.
Blend D = 70% PC + 20% PBzMA-PiP of Example 1 + 10% PiP.
Blend E = 90% PC + 10% PPhMA-PiP of Example 2.
Blend F = 90% PC + 5% Polybutadiene Rubber.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of United States is:

1. A resin composition comprising a blend of:
   (I) 99 to 1 wt % of a polycarbonate of formula

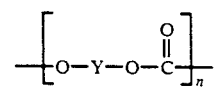

wherein Y is a divalent aromatic radical of formula

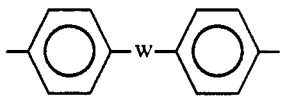

wherein W is $C_1$–$C_6$ straight or branched alkyl, carbonyl, sulfonyl, oxygen, sulfur or a single bond and m is a whole number between 10 and 30,000;

(II) 1 to 99 wt % of a block copolymer containing a block of polyaromatic(alkyl)methacrylate of formula

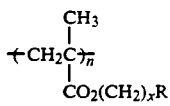

where n is an integer from 10 to 5,000; x is an integer from 0 to 4 and R is phenyl, naphthyl or phenyl substituted by $C_1$–$C_6$-alkyl, $C_1$–$C_6$-alkoxy, hydroxy, amino, carbonyl or $C_1$–$C_6$-alkoxycarbonyl and a block of rubbery polymer selected from the group consisting of poly-$C_4$–$C_{10}$-alkylacrylate, dienic rubber, siloxane elastomer polyburyl methacrylate and saturated hydrocarbon.

2. The composition of claim 1 comprising 10–90 wt. % of component (I).

3. The composition of claim 1 comprising 35–90 wt. % of component (I).

4. The composition of claim 1, wherein R is phenyl and x is 1.

5. The composition of claim 1 wherein R is phenyl and x is 0.

6. The composition of claim 1, wherein the block copolymer is represented by the formula A-b-B, A-b-B-b-A, B-b-A-b-B or (A-B)$_n$ where A is said aromatic(alkyl)methacrylate and B is polyisoprene, polybutadiene, saturated hydrocarbon, polylauryl methacrylate, or polybutyl acrylate.

7. The composition of claim 6 wherein the ratio of A to B is 1:3 to 1:5.

8. The resin composition of claim 6 wherein block A has a molecular weight of 12,000 to 85,000 g/mol and block B has a molecular weight of 30,000 to 150,000.

9. The resin composition of claim 1 wherein component (I) is a polycarbonate containing Bisphenol A.

10. The resin composition of claim 1 further comprising up to 15 wt. % of a homopolymer corresponding to the individual blocks of component (II).

11. The resin composition of claim 6 wherein block B is a saturated hydrocarbon.

12. A block copolymer represented by the formula A-b-B, A-b-B-b-A, B-b-A-b-B or (A-B)$_n$; where A is a block of the formula

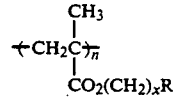

where n is an integer from 10 to 5,000; x is an integer from 0 to 4 and R is phenyl, naphthyl or phenyl substituted by halogen, phenyl, $C_1$–$C_6$ alkyl, $C_1$–$C_6$ alkoxy, hydroxy, amino, carbonyl, or $C_1$–$C_6$ alkoxy carbonyl; B is a rubbery polymer selected from the group consisting of poly-$C_4$–$C_{10}$-alkylacrylate, dienic rubber, siloxane elastomer polylauryl methacrylate and saturated hydrocarbon; and "b" indicates a block structure.

13. The block copolymer of claim 12 wherein said rubbery polymer is polyisoprene, polybutadiene, polylauryl methacrylate, polybutyl acrylate, or saturated hydrocarbon.

14. The block copolymer of claim 12 wherein the molecular weight of A is 10,000–85,00 g/mole.

15. The block copolymer of claim 12 wherein the molecular weight of B is 10,000–150,000 g/mole.

16. The block copolymer of claim 12 wherein the weight ratio of A to B is 1:3 to 1:5.

17. The block copolymer of claim 12 wherein the weight ratio of A to B is within the range 0.1:1 to 1:1.

18. The block copolymer of claim 12 wherein block B is a saturated hydrocarbon.

* * * * *